United States Patent [19]

Karcher et al.

[11] 3,997,148
[45] Dec. 14, 1976

[54] COUPLER FOR TUYERE PUNCHES

[75] Inventors: Thomas D. Karcher, Rocky River; Richard J. Silagy, Parma, both of Ohio

[73] Assignee: The Hansen Manufacturing Co., Cleveland, Ohio

[22] Filed: Sept. 23, 1974

[21] Appl. No.: 508,534

[52] U.S. Cl. .............................. 266/218; 285/277
[51] Int. Cl.[2] ..................... C21C 5/42; C22B 15/06
[58] Field of Search ............. 266/41, 218; 285/226, 285/277, 302

[56] References Cited

UNITED STATES PATENTS

| 2,415,740 | 2/1947 | Gammack | 285/302 |
|---|---|---|---|
| 2,463,253 | 3/1949 | Earle et al. | 285/277 |
| 2,736,578 | 2/1956 | Rafferty | 285/277 |
| 3,328,016 | 6/1967 | Foard et al. | 266/41 |
| 3,419,293 | 12/1968 | Conrad | 285/302 |

FOREIGN PATENTS OR APPLICATIONS

| 1,378,801 | 11/1959 | France | 285/277 |
|---|---|---|---|
| 1,412,369 | 12/1962 | France | 285/277 |
| 1,230,273 | 12/1966 | Germany | 285/277 |
| 1,904,927 | 8/1970 | Germany | 285/277 |
| 45-11603 | 4/1970 | Japan | 266/41 |

OTHER PUBLICATIONS

Bulletin Ax-97, Oct. 17, 1961, The American Brass Company, Waterbury, Conn.

*Primary Examiner*—Roy Lake
*Assistant Examiner*—Paul A. Bell

[57] ABSTRACT

A tuyere and tuyere punch assembly on a converter for processing metals includes a quick disconnect coupling connection for a variable length conduit assembly through which blowing gas is supplied to the tuyere from a blowing gas supply manifold having a connection spaced a fixed distance from the quick disconnect coupling connection. The variable length conduit assembly includes a corrugated tube having one end portion slidably received in fluid sealing engagement with a sleeve portion of a plug member having a locking nose cooperable with a socket on the quick disconnect coupling connection. The variable length conduit assembly provides easy insertion and removal thereof between the two connections and special easily replaceable elastomeric coupling seals minimize malfunction of movable parts on the quick disconnect coupling.

13 Claims, 7 Drawing Figures

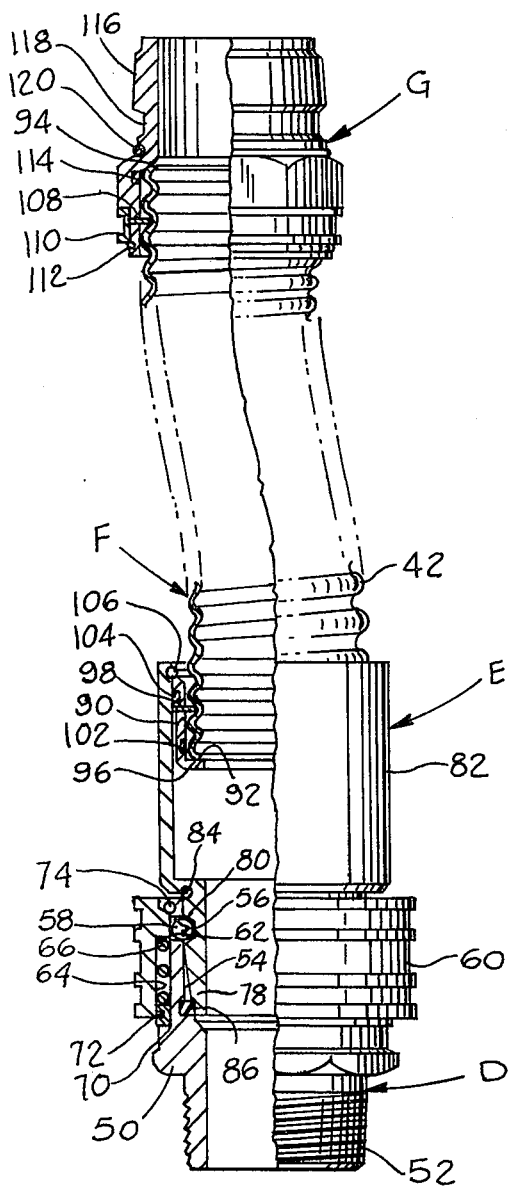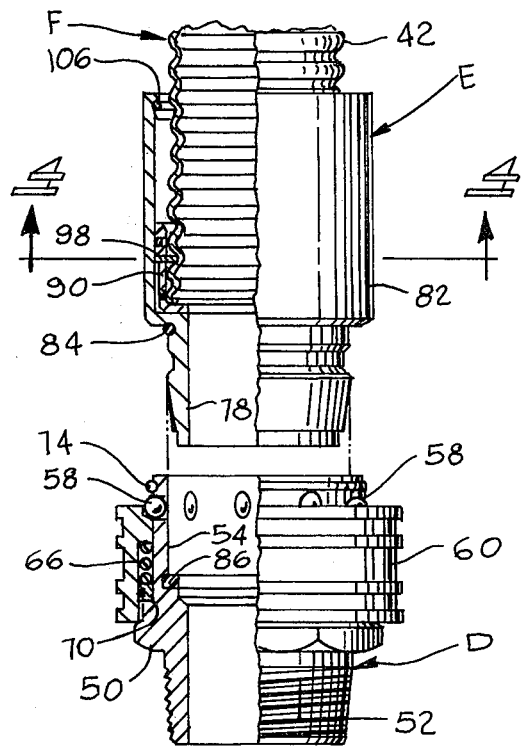
Fig.3
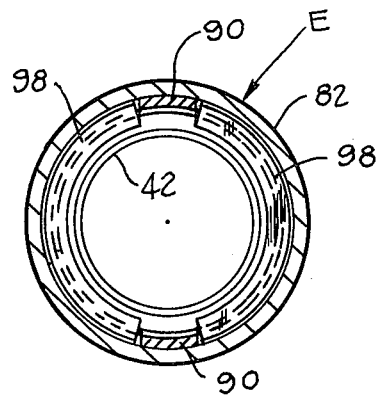
Fig.2
Fig.4

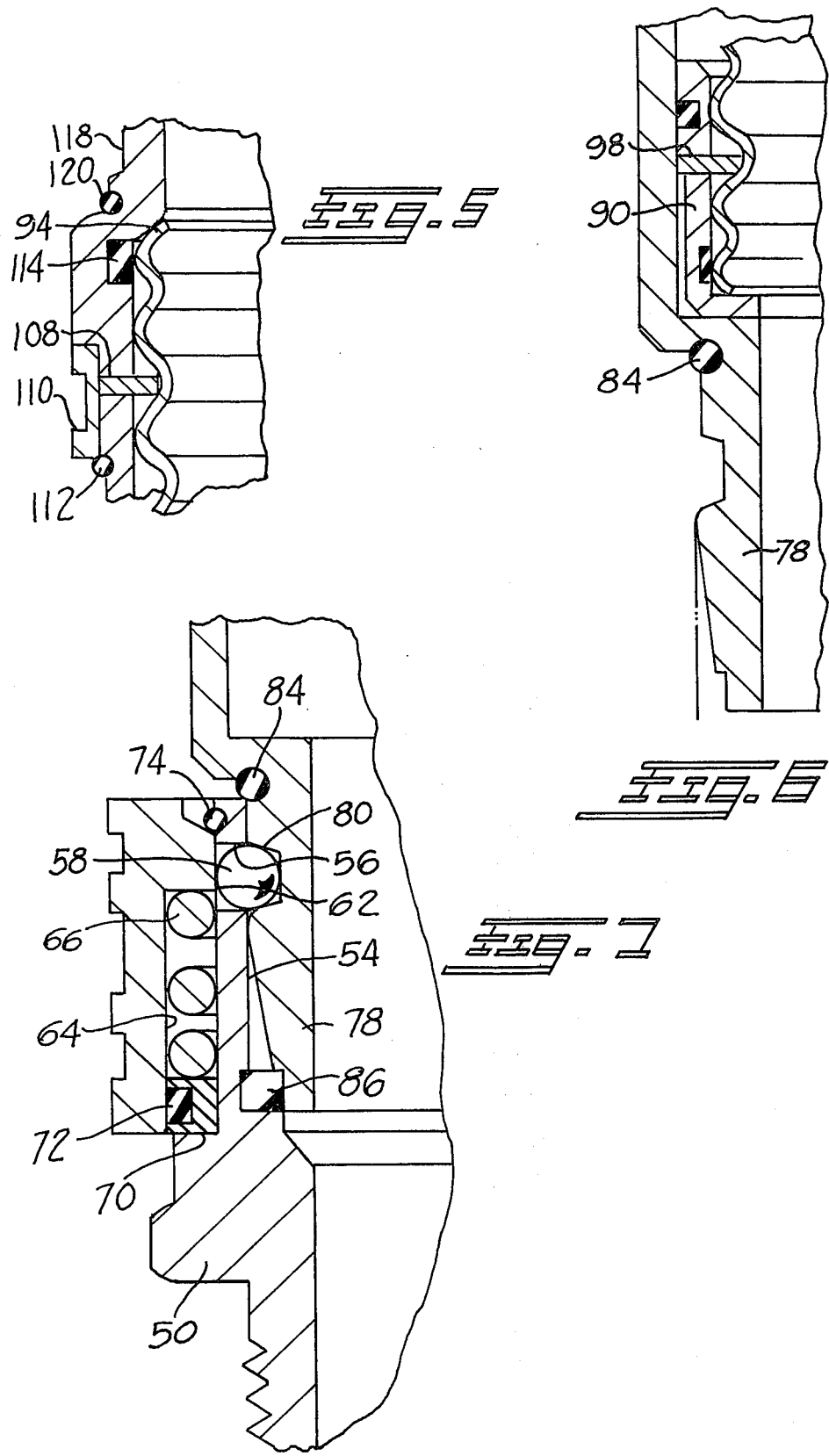

COUPLER FOR TUVERE PUNCHES

BACKGROUND OF THE INVENTION

This application relates to a coupler for connecting a blowing air conduit assembly with a tuyere equipped with a tuyere punch. Although the invention will be described particularly for use with a tuyere equipped with a tuyere punch, it will be recognized that certain aspects of the invention have broader applications, and the coupler and conduit assembly may be used in other environments.

Converters for processing metals are commonly supplied with tuyeres in the form of pipes extending through the converter wall for supplying blowing air to the converter. A Y-fitting secured to the converter mounts a tuyere punching device including an elongated rod reciprocatingly extending through the tuyere pipe for selective operation to punch obstructions such as slag from the pipes. The Y-fitting also includes a connection for connecting a conduit assembly which supplies blowing gas to the tuyeres. The tuyere punch and blowing gas supply conduit assembly are exposed to a very dirty and oxidizing environment, and must be replaced or removed for cleaning and repair at relatively frequent intervals. The connections commonly used on the blowing gas supply conduit are of the screw thread-type, and removal and replacement thereof is very time consuming. Another problem is that the connection of the manifold supplying the blowing gas is spaced-apart a predetermined distance from the connection on the Y-fitting and these connections are at fixed location. The high temperature, dirty and oxidizing environment requires the use of stainless steel tubing for the blowing gas supply conduit assembly, and it is difficult to position such a tube and make proper connections due to the space limitations between the connections.

Conventional quick disconnect couplings cannot be used on a conduit assembly of the type described because the stainless steel tubing is relatively not extensible or retractable, and the space limitations make it impossible to insert and remove a conventional locking nose on a plug with respect to a socket on a quick disconnect coupling. In addition, conventional quick disconnect couplings are not properly sealed against entry of dirt into the area of the locking balls and biasing spring so use of a conventional quick disconnect coupling in an environment of the type described would soon render such coupling inoperative.

SUMMARY OF THE INVENTION

A converter for processing metals includes a tuyere through which blowing gas is supplied. A Y-fitting attached to the converter mounts a tuyere punching device for removing obstructions from the tuyere and includes a quick disconnect coupling to which variable length conduit assembly is connected for supplying blowing gas to the tuyere.

In accordance with the invention, the variable length conduit assembly includes a corrugated metal tube having an adapter on one end portion thereof. A plug member having a forward locking nose receivable in a socket on the quick disconnect coupling includes an elongated rear sleeve portion slidably receiving the adapter in fluid sealing engagement therewith for providing relative telescoping movement between the plug member and adapted for varying the length of the conduit assembly. Connections on the Y-fitting and on a manifold supplying blowing gas are spaced-apart a predetermined distance at fixed locations, and the conduit assembly can be shortened for insertion thereof between the connections and is then lengthened for attaching the conduit assembly to the connections by sliding the plug member relative to the adapter. Shortening of the conduit assembly also makes it possible to easily remove such asembly from between the connections.

The corrugated metal conduit has exterior alternating peaks and valleys, and in a preferred arrangement the adapter comprises a cylindrical member having circumferentially-spaced radial slits therethrough receiving arcuate locking keys which extend into the valleys. The adapter has inner and outer circumferential grooves respectively receiving elastomeric tube and adapter seals. The tube seal is compressed between the bottom of the inner adapter groove and a peak on the tube, and the adapter seal is compressed between the bottom of the outer groove and the inner surface of the plug sleeve portion. Releasable retaining means is provided for retaining the adapter within the sleeve portion against complete displacement therefrom.

The quick disconnect coupling includes a body member having a socket for receiving the locking nose on the plug, and includes a plurality of locking elements moveable generally radially inwardly and outwardly relative to the socket. A slide ring on the body member has a locking element engaging surface and a spring cavity receiving spring means for yieldably biasing the slide ring to a locking position engaging the locking elements. Continuous elastomeric coupling seals are provided between the body member and slide ring outwardly of the locking elements and spring means for preventing contamination of such locking elements and spring means.

In a preferred arrangement, the body member has a circumferential groove outwardly of the locking elements receiving one of the coupling seals which also acts as a stop ring against which the slide ring abuts in the locking position thereof.

The locking nose on the plug has a circumferential groove for receiving the locking elements on the body member and includes an additional circumferential groove spaced toward the sleeve portion thereof for receiving an elastomeric locking nose seal which cooperates with the body member adjacent the socket when the locking nose is received in the socket.

It is a principal object of the present invention to provide an improved coupler for tuyere punches.

Another object of the invention is to provide an improved variable length conduit assembly for use with quick disconnect couplings.

An additional object of the invention is to provide an improved arrangement for connecting a conduit which supplies blowing gas to a tuyere on a metal processing converter.

Other objects and advantages of the invention will be readily apparent to those skilled in the art as the following description proceeds when taken in connection with the accompanying drawings.

DESCRIPTION OF THE DRAWING

FIG. 2 is an elevational view showing a variable length conduit assembly used with the device of FIG. 1, and with portions in section for clarity of illustration;

FIG. 3 is a view similar to FIG. 2 and showing a telescoped position of a plug member relative to a tube;

FIG. 4 is a cross-sectional elevational view looking generally in the direction of arrows 4—4 of FIG. 3;

FIG. 5 is an enlarged sectional view of a portion of a plug member of FIG. 2;

FIG. 6. is an enlarged sectional view of a portion of the plug member of FIG. 3; and FIG. 7 is an enlarged sectional view of an interconnected plug and socket assembly of FIG. 2.

DESCRIPTION OF A PREFERRED EMBODIMENT

Figure 1:
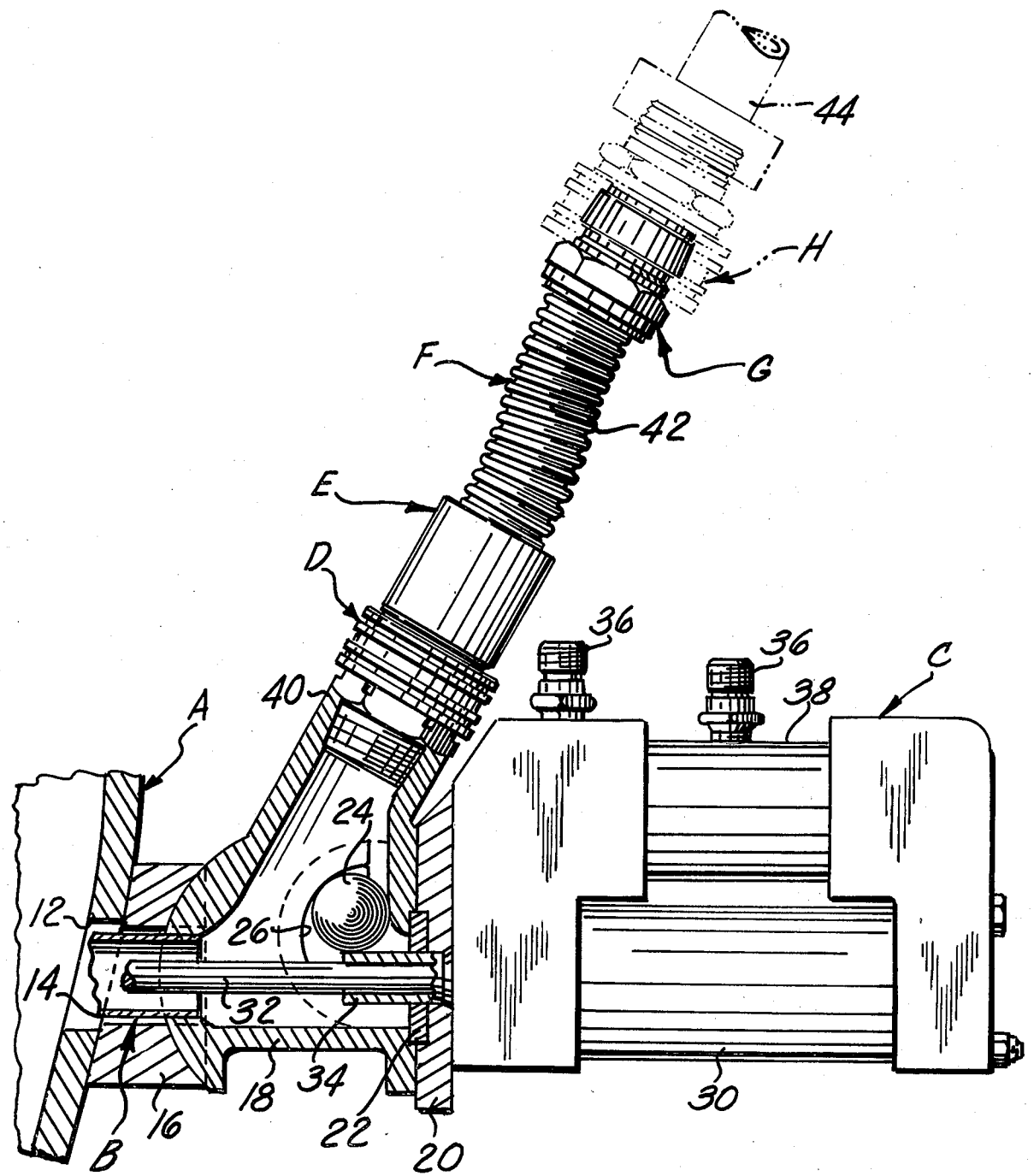
FIG. 1 is a side elevational view showing a portion of a metal processing converter having a tuyere, tuyere punch and blowing gas supply conduit, and with portions in section for clarity of illustration.

Referring now to the drawing, wherein the showings are for purposes of illustrating a preferred embodiment of the invention only and not for purposes of limiting same, FIG. 1 shows a converter A for processing metal, and having an opening 12 extending through the wall and refractory lining thereof for receiving a tuyere B in the form of a cylindrical pipe 14 through which blowing gas is supplied to converter A. A seat 16 surrounds pipe 14 on the exterior wall of converter A and a Y-fitting 18 connected with the outer end of tuyere pipe 14 is secured to converter A against seat 16 in a known manner so that blowing gas supplied to the interior of Y-fitting 18 flows through tuyere pipe 14.

An adapter plate 20 positioned against the rear end of Y-fitting 18 is provided for mounting a tuyere punching device C to such fitting. A ball seat 22 between adapter 20 and the rear end of fitting 18 is provided for cooperation with a ball 24 guided in arcuate guides 26 for sealing the opening through ball seal 22 when tuyere punching device C is removed from fitting 18.

Tuyere punching device C includes a fluid motor 30 containing a reciprocating piston having an elongated rod 32 extending therefrom through a guide 34, and such rod extends into tuyere pipe 14. Tuyere punching device C includes suitable fittings as at 36 to which air supply conduits or control devices may be connected for controlling operation of valve unit 38 which controls the supply of air to fluid motor 30 for reciprocating the piston and its rod 32. When slag or other obstructions build up at the inner end of tuyere pipe 14, fluid motor 30 is operated for moving rod 32 at high velocity through tuyere tube 14 for removing the obstruction. Compressed air built up forwardly of the piston in fluid motor 32 rapidly returns the piston and rod 32 to their retracted positions. Control of valve assembly 38 for operating fluid motor 30 may be automatic as by sensing the pressure change in the blowing gas supply conduit when an obstruction occurs, or may be performed manually at selective intervals if so desired.

A blowing gas inlet 40 is provided on Y-fitting 18 and has a quick disconnect coupling D secured thereto for cooperation with a locking nose on plug member E which is attached to one end portion of corrugated stainless steel tube 42 of a variable length conduit assembly F which has another plug member G attached to its other end for cooperation with a quick disconnect coupling H on an outlet pipe 44 of a blowing gas supply manifold. The blowing gas supply manifold and Y-fitting 18 are fixed in position, and quick disconnect couplings D and H therefore define connections which are spaced-apart a predetermined distance at fixed locations. Such connections D and H are normally positioned so that the longitudinal axis of tube 42 must be bent slightly into somewhat of an S-shaped curve as shown in FIGS. 1 and 2 when it is properly installed. Although corrugated metal tube 42 can be slightly bent to the desired curvature, it is relatively inflexible, and cannot readily be extended or compressed without the use of special tools which may damage such tube. Therefore, connecting the opposite ends of tube 42 to connections D and H is extremely difficult because such connections are in fixed locations spaced-apart a predetermined distance.

As best shown in FIGS. 2 and 7, quick disconnect coupling D includes a body member 50 having an externally threaded end portion 52 which is threaded into inlet 40 of Y-fitting 28 as shown in FIG. 1. Body member 50 has an inwardly tapered socket 54 and a plurality of circumferentially spaced inwardly tapered holes 56 through body member 50 around socket 54 movably receive balls 58 defining locking elements which move generally radially inwardly and outwardly relative to socket 54. A generally circular slide ring 60 is slidably received over body member 50 outwardly of socket 54, and includes a ball engaging surface 62 and a spring cavity 64 receiving a coil spring 66 which normally biases slide ring 60 to a locking position wherein ball engaging surface 62 holds balls 58 radially inwardly. A guide ring 70 positioned around body member 50 provides a bearing surface for one end of spring 66 and has a continuous circumferential groove in its outer surface receiving continuous elastomeric coupling seal 72 which is compressed between the bottom of the groove in guard ring 70 and the peripheral surface of cavity 64. Body member 50 has a continuous circumferential groove in its outer surface outwardly of ball receiving holes 56 receiving a continuous elastomeric coupling seal 74 which also defines a stop ring against which slide ring 60 abuts in its locked position. In normal quick disconnect couplings, ring 74 is a split metal snap ring which does not provide a good seal for excluding dirt from entering the area of balls 58, particularly in view of the fact that it is split. Coupling seals 72 and 74 provide seals between body member 50 and slide ring 60 outwardly of balls 58 and spring 66 for preventing dirt from entering the spring cavity and the area of the balls.

Plug member E (see FIGS. 2, 3, 6 and 7) includes a tapered locking nose 78 receivable in socket 54 and having an outer circumferential groove 80 for receiving balls 58 to releasably secure locking nose 78 within socket 54. Locking nose 78 has an external continuous circumferential groove therein spaced from ball receiving groove 80 in a direction toward elongated plug sleeve portion 82 for receiving a circumferential elastomeric locking nose seal 84 which is compressed between locking nose 78 and body member 50 adjacent socket 54 when locking nose 78 is received in socket 54. A continuous elastomeric socket seal 86 is received in a suitable circumferential groove at the bottom of socket 54, and is compressed between the bottom of such groove and the outer surface of locking nose 78.

Slide ring 60 is manually movable toward the bottom in FIG. 2 against the yieldable biasing force of spring 66 for moving ball engaging surface 62 away from balls 58 so that such balls can move radially outwardly for permitting insertion and removal of locking nose 78 relative to socket 54. Elongated cylindrical sleeve portion 82 of plug member E slidably receives a generally cylindrical member 90 defining an adapter which is secured to one end portion of corrugated tube 42 having alternating exterior peaks and valleys. Tube 42 is corrugated in such a manner that it terminates at its opposite ends in inwardly extending flat end portion 92 and 94. Adapter 90 has an inwardly extending flange portion 96 against which tube end 92 abuts when the end portion of such tube is received in adapter 90. Adapter 90 has circumferentially spaced slits therein receiving arcuate locking keys 98 which extend into a valley between two adjacent peaks on the exterior of tube 42 for releasably attaching adapter 90 to an end portion of tube 42. Adapter 90 has a continuous inner circumferential groove adjacent flange 96 receiving an elastomeric tube seal 102 which is compressed between the bottom of such inner groove and the terminal peak on corrugated tube 42 to provide a fluid seal. Adapter 90 includes an outer circumferential groove receiving an elastomeric adapter seal 104 which is compressed between the bottom of such outer groove and the inner surface of sleeve portion 82. With the arrangement described, adapter 90 is secured to an end portion of tube 42 and is slidable relative to elongated sleeve portion 82 in fluid sealing engagement therewith to provide relative telescoping movement between tube 42 and sleeve portion 82. A removable snap ring 106 fits into a suitable groove in sleeve portion 82 outwardly of adapter 90 to define a retaining means for releasably retaining adapter 90 within sleeve portion 82 against complete displacement therefrom.

The other end portion of tube 42 has plug member G (see FIGS. 2 and 5) attached thereto by arcuate locking keys 108 extending through circumferentially spaced slits in such plug member and extending into a valley between adjacent peaks on tube 42. A retaining ring 110 positioned over the outside of plug member G retains arcuate locking keys 108 in place and a removable snap ring 112 positioned in a suitable exterior circumferential groove in plug member G releasably holds retaining ring 110 in position. Plug member G has a suitable inner circumferential groove receiving an elastomeric tube seal 114 which is compressed between the bottom of such groove and the last peak on tube 42. Locking nose 116 on plug member G cooperates with quick disconnect coupling H, which is of the same type as that described with respect to quick disconnect coupling D, and such locking nose includes a circumferential exterior ball receiving groove 118, and another circumferential groove receiving an elastomeric locking nose seal 120 in the same manner as described with respect to seal 84 on locking nose 78.

To install variable length coupling assembly F, plug member E and one end portion of tube 42 are telescoped as shown in FIG. 3 so that the length of conduit assembly F is less than the predetermined distance between the fixed connections defined by quick disconnect couplings D and H so that such assembly can be positioned between such connections. Plug member G may then be connected with coupling H, and plug member E is slid away from tube 42 and adapter 90 until locking nose 78 thereof is received in socket 54. Conduit assembly F is easily removable in the same manner by shifting slide ring 60 to free balls 58 so that locking nose 78 can be removed from socket 54 by telescoping adapter 90 within elongated sleeve portion 82 until the conduit assembly has a length less than the predetermined distance between couplings D and H. Obviously, plug member G is also released from its connection with coupling H so that entire conduit assembly F can easily be removed.

Although the invention has been shown and described with respect to a preferred embodiment, it is obvious that equivalent alterations and modifications will occur to others skilled in the art upon the reading and understanding of this specification. The present application is intended to cover all such equivalent alterations and modifications, and is limited only by the scope of the claims.

We claim:

1. Apparatus comprising; a converter for processing metals and including a tuyere through which blowing gas is supplied, a blowing gas supply conduit having one conduit end portion connected in fluid flow communication with said tuyere by a quick disconnect coupling, a plug member cooperable with said quick release coupling and having an elongated sleeve portion slidably receiving said conduit end portion in fluid sealing engagement therewith for providing relative telescoping movement between said plug and conduit end portion.

2. The apparatus of claim 1 wherein said plug has a locking nose and said quick disconnect coupling has a socket receiving said locking nose, said plug member being axially movable relative to said conduit end portion for axially moving said locking nose into and out of said socket, said quick disconnect coupling including generally radially movable selectively releasable locking elements for releasably locking said locking nose in said socket.

3. The apparatus of claim 2 wherein said socket is in a body member and said quick disconnect coupling includes a slide on said body member ring having a spring cavity receiving spring means for biasing said slide ring to a locking position engaging said locking elements, and continuous circumferential elastomeric coupling seals between said body member and slide ring outwardly of said spring means and locking elements.

4. The apparatus of claim 3 wherein said body member has a circumferential groove therein outwardly of said locking elements receiving one of said coupling seals which also defines a stop ring against which said slide ring abuts in said locking position thereof.

5. The apparatus of claim 3 and including a circumferential elastomeric locking nose seal between said locking nose and said body member adjacent said socket.

6. The apparatus of claim 1 wherein said conduit comprises a corrugated metal tube having an adapter attached to said one end portion, said adapter being slidably received in said sleeve portion of said plug in fluid sealing engagement therewith.

7. The apparatus of claim 6 wherein said adapter comprises a cylindrical member having a plurality of circumferential slits therein and said tube has alternating exterior peaks and valleys, and arcuate locking keys received in said slits and projecting into said valleys.

8. The apparatus of claim 6 wherein said adapter has inner and outer circumferential grooves respectively receiving elastomeric tube and adapter seals, said tube seal being compressed between said tube and the bottom of said inner groove, and said adapter seal being compressed between said sleeve portion and the bottom of said outer groove.

9. The apparatus of claim 1 wherein said quick disconnect coupling is on a fitting member to which a tuyere punching device is mounted and has a rod punch member reciprocable through said tuyere.

10. The apparatus of claim 1 wherein said conduit is connected at its other end with a connection on a blowing gas supply manifold, said connection and said quick disconnect coupling being spaced-apart a predetermined distance at fixed locations, said conduit and plug defining a conduit assembly and said plug and conduit being slidable toward one another for decreasing the length of said assembly to a length less than said predetermined distance and being slidable away from one another for increasing the length of said assembly sufficiently for attaching said plug to said quick disconnect coupling and the other end of said conduit to said connection while said assembly is positioned between said connection and said quick disconnect coupling.

11. The apparatus of claim 10 wherein said connection and quick disconnect coupling are spaced-apart generally along a line extending transversely of the longitudinal axis of said tuyere.

12. An apparatus comprising a converter for processing metals, said converter including a tuyere through which blowing gas is supplied to the interior of said converter, a blowing gas supply fixture disposed in a fixed spatial relationship with said tuyere, conduit means for conducting blowing gas, said conduit means having an axial length which is less than the distance between said blowing gas fixture and said tuyere, and first and second coupling means for connecting opposite ends of said conduit means with said tuyere and with said blowing gas fixture, said first coupling means including a first quick disconnect coupling element disposed in a fixed relationship with said tuyere and a second quick disconnect coupling element connected with one end portion of said conduit means, said second quick disconnect coupling element being movable axially relative to said conduit means between a retracted position and an extended position, an axially outermost end portion of said second quick disconnect coupling element being disposed a first distance as measured along the central axis of said conduit means from said second coupling means when said second quick disconnect coupling element is in said retracted position, said axially outermost end portion of said second quick disconnect coupling element being disposed a second distance as measured along the central axis of said conduit means from said second quick disconnect coupling element is in said extended position, said second distance being greater than said first distance and being at least substantially as great as the distance between said blowing gas supply fixture and said tuyere.

13. An apparatus as set forth in claim 12 wherein said first coupling means further includes a sleeve connected with said second quick disconnect coupling element, said one end portion of said conduit means being telescopically received in said sleeve to provide for movement of said second quick disconnect coupling element between said extended and retracted positions.

* * * * *